United States Patent [19]

Brandes

[11] 4,126,422

[45] Nov. 21, 1978

[54] METHOD OF DENSIFYING METAL OXIDES

[75] Inventor: Lewis H. Brandes, Campbell, N.Y.

[73] Assignee: Corning Glass Works, Corning, N.Y.

[21] Appl. No.: 680,452

[22] Filed: Apr. 26, 1976

[51] Int. Cl.$^2$ .............................................. B01J 8/00
[52] U.S. Cl. ........................ 23/293 R; 23/313 R; 65/DIG. 14; 65/27
[58] Field of Search .......... 23/293 R, 293 A, 293 S; 65/DIG. 14, 27, 11; 423/335–337, 592; 259/182; 106/288 B

[56] References Cited

U.S. PATENT DOCUMENTS

| | | | |
|---|---|---|---|
| 3,539,294 | 10/1970 | Hwang | 23/293 X |
| 3,760,051 | 9/1973 | Eirich et al. | 65/27 X |
| 3,875,282 | 4/1975 | Steinreich | 65/27 X |
| 3,932,140 | 1/1976 | Jayawant et al. | 23/293 A |
| 3,937,797 | 2/1976 | Romanski et al. | 23/293 R |

*Primary Examiner*—Norman Yudkoff
*Attorney, Agent, or Firm*—Milton M. Peterson; Clinton S. Janes, Jr.; Clarence R. Patty, Jr.

[57] ABSTRACT

A method for densifying a fumed metal oxide of Groups III and IV prepared by either a vapor phase oxidation or combustion process is disclosed wherein the metal oxide is mixed with a polar liquid in a high shear mixer, the metal oxide being present in an amount of about 35–50%, to convert it into a granulated material which, when dried, will substantially all pass through a 10 mesh screen. The granulated material may then be calcined preparatory to wet milling to prepare a casting slip, or it may be vitrified directly for molding or drawing in known manner.

6 Claims, No Drawings

METHOD OF DENSIFYING METAL OXIDES

BACKGROUND OF THE INVENTION

This invention relates to a method of densifying fumed metal oxides and to further processing of such densified oxides.

A "fumed" metal oxide is a finely divided material, such as silica, that may be prepared by either a vapor phase oxidation or a combustion process. In a typical vapor phase process, vapors of a metal compound, such as silicon tetrachloride ($SiCl_4$), are thermally converted in the presence of moisture to the corresponding oxide, e.g. silica. In a combustion process, a combustible metal compound, such as a silicon halide or halosilane, is burned to produce the oxide. The former process is described, for example, in U.S. Pats. No. 2,272,342 granted Feb. 10, 1942 to J. F. Hyde, and No. 2,268,589 granted Jan. 6, 1942 to J. A. Heany. The latter process is described, for example, in U.S. Pat. No. 2,823,882, granted Feb. 18, 1958 to O. Saladin et al.

The oxides thus obtained are customarily finely divided, low density, fluffy materials characteristically having an average particle size in the range of 10 to 50 millimicrons and a surface area in the range of 100 to 400 $m^2$/gram. Typically, the particles are agglomerated in clusters reminiscent of grape clusters. Such oxide materials are widely used in paints, rubber products, and other organic materials.

It has been recognized that such fumed oxides are highly active, and hence may be consolidated at lower than normal temperatures. In particular, glass forming oxides such as silica can be converted to solid glass bodies below normal melting temperatures. Accordingly, fumed metal oxides, produced by vapor phase or combustion processes, provide a convenient means of obtaining high purity oxide products, such as fused silica glass, by starting with high purity materials. Thus, the purity of the end product may be made dependent on the purity of the materials processed.

For at least one application, high purity glasses may be defined as containing no more than ten parts per million (ppm) alkali metal ions and less than one ppm transition metal ions. This application for high purity glasses occurs in the production of melting crucibles used by the semiconductor industry, in particular, high purity silica crucibles used for melting and drawing silicon. Glasses having a high purity level are also required in a variety of other products, such as antenna windows and radomes. Another area of interest, from a refractory rather than a purity standpoint, is cores for metal castings.

It would therefore be desirable to use fumed oxides in producing such varied high purity products. However, it is difficult to compress these oxides by ordinary pressing or pelletizing techniques to form homogeneous green bodies that may either be vitrified to a body of clear glass or consolidated to a dense ceramic body. Further, in their characteristic low density form, they do not lend themselves to mixing with the vehicles normally used in slip casting. It is therefore a primary purpose of this invention to circumvent these problems by providing a novel method of densifying fumed metal oxides, especially silica, whereby the utility of such oxides in the production of glass and ceramic products is greatly enhanced.

PRIOR ART

In addition to the art already mentioned, U.S. Pat. No. 3,762,936, granted Oct. 2, 1973 to R. K. Iler, discloses use of a mechanical mixer to form slurries or suspensions from silica-boric oxide mixtures. The milling of calcined materials to form casting slips, and the casting and firing of green bodies from such slips, are well known commercial operations. Finally, it has been proposed to add liquids to glass batches to facilitate the conversion of such batches into either pellets or agglomerates for ease in batch feeding and/or prevention of dusting.

RELATED CASE

Ser. No. 680,061, now U.S. Pat. No. 4,042,361 filed of even date herewith by P. P. Bihuniak, L. H. Brandes and D. L. Guile and entitled "Method of Densifying Metal Oxides", discloses and claims a method wherein a fumed metal oxide is mixed with a polar liquid to form a sol and then dried to form fragments which may be calcined and milled to form a casting slip.

SUMMARY OF THE INVENTION

My invention is a method of densifying a fumed metal oxide which comprises mechanically mixing the metal oxide with a liquid, the amount of liquid and the conditions of mixing being sufficient to form a moist granulated material but insufficient to form a liquid suspension or gel, and drying the granulated material thus formed, the dried material substantially all passing through a 10 mesh screen. In one embodiment the granular material may be calcined at a temperature in the range of 1150° C. to 1500° C., and then milled to form a casting slip. In another embodiment, the dry granular material may be directly melted and formed by known glass working procedures.

GENERAL DESCRIPTION

Procedures for the production of fumed metal oxides, such as the vapor phase oxidation and combustion processes mentioned earlier, are known. Silica is the oxide of primary commercial significance at the present time, and the invention is therefore specifically described with respect to processing of this oxide. However, it will be appreciated that the invention is not so limited, in particular oxides of Groups III and IV being contemplated. While the invention is specifically illustrated with reference to silica, because of the present interest therein, it is believed that this illustrative description will enable one of ordinary skill to apply the inventive principles to any fumed oxide.

Again, while the invention is illustrated with reference to processing of a single oxide, it will be appreciated that mixed oxide compositions of high purity may be of interest, and hence are contemplated. Also, the present invention is adapted to the incorporation of small controlled amounts of one or more specific additives in the nature of dopants. Where the additive is a solid, it must be finely divided to permit adequate dispersion. Preferably, the additive is a soluble form, such as a nitrate or other soluble salt. Then the additive is dissolved in the vehicle and is uniformly applied to the fine granules formed by mixing. As such it remains dispersed and cannot separate or settle on standing.

Referring specifically to fumed silica, such materials are customarily identified in terms of surface area rather than particle size. In general such materials may be produced in the range of 50 to 500 m²/gram, but we prefer materials in the range of 100 to 400 m²/gram for ease in mixing without undue dusting.

While any polar liquid may be used, water is satisfactory and hence will normally be used. However other volatile liquids such as the simple alcohols may be used if water must be avoided for some reason.

In companion application Ser. No. 680,061 referred to earlier, it is disclosed that fumed oxides may form colloidal suspensions (sols) when mechanically mixed, in amounts up to about 45% solids, with water. While sols may be formed with somewhat higher solids content, 45% solids is generally regarded as a practical limit. The method thus described has many advantageous features, but does require special drying techniques to produce fragments of desired size.

The present invention contemplates mixing amounts of fumed silica greater than about 35% total solids, and preferably over 38% with a liquid such as water in a mechanical mixer. Preferably a high shear mixer, such as disclosed in U.S. Pat. No. 2,945,634 issued July 19, 1960 to Henschel-Werke Gesellschaft, is employed. Such mixer characteristically embodies two sets of flat blades vertically spaced and set at right angles to each other.

When the solids content exceeds about 35%, extra shear energy is required. To some extent, added time will suffice, but the most effective procedure is to increase shear rate, that is mixer speed. For example, a 38% solids batch may be mixed in a high shear mixer operating at 1800 rpms for up to 5 minutes while remaining in granular form. However, if the mixer speed is increased to 3800 rpm, the batch changes to a sol in less than a minute.

In general, a batch with a solids content over 45% is difficult to convert to a sol under normally available operating conditions. Likewise, below about 35%, the batch changes quickly to a liquid sol state. It is possible to use smaller energy mixers, such as food mixers, and thus employ lower solids contents. However, the degree of densification is lower and a major advantage of lower liquid content is lost. Hence, mixing will normally be in a high shear mixer and the solids content will be at least 35% and preferably over 38%.

The maximum amount of total solids content that can be handled efficiently is about 50%, and we prefer mixtures in the range of 38–45%. By total solids content is meant the percentage by weight of total solids based on the weight of solids plus liquid.

I have found, quite surprisingly, that, when a fumed oxide is mixed with sufficient liquid (water) to form a sol, but under mixing conditions (time and mixer speed) insufficient to form such sol, a granulated material of markedly increased density is produced. Further, the material has a relatively fine size similar to granulated sugar. As a means of densifying fumed oxides then, the present method provides certain significant advantages. First, the amount of liquid to be removed is diminished, and the manner of drying is more flexible. For example, a batch of the present granular type material may be dried in any suitable container or on a conventional conveyor belt dryer. Second, the fine granular material produced is more adaptable to milling for casting slips and the like. Thus, the particle size is generally considerably smaller than even fragments produced by drying thin layers of sols. Further, a substantial and generally adequate degree of densification occurs during the granulating step and subsequent calcining if this is performed. Even from the standpoint of economy in material handling, it is a distinct advantage to handle the material in densified form.

SPECIFIC DESCRIPTION

In the examples that follow, a fumed silica is used that is designated as Cab-O-Sil ® MS-7 and is available from the Cabot Corporation, Boston, Mass. This material has a specific surface area of about 200 m²/gram and a bulk density of about 4 lbs./cu. ft.

EXAMPLE 1

Fifteen hundred grams of MS-7 fumed silica, predampened, was placed in a high shear mixer and water added to provide 2450 grams of water total. The mixer was closed and operated at 1800 rpm for 5 minutes. The mixer was then stopped, opened and the fine, sugarlike, moist silica was emptied into a drying container in which it was dried overnight at 140° C. The bulk density of the material after mixing and drying was measured and found to be about 16 lbs./cu. ft. as compared to the original value of 4 lbs./cu. ft. A sieve analysis (U.S. Standard) showed the following particle size distribution:

| Mesh Size | Wt. % |
|---|---|
| +10 | — |
| −10 +100 | 17.6 |
| −100 +200 | 8.4 |
| −200 +325 | 15.7 |
| −325 | 58.3 |

The thus densified material was then calcined by heating at 1350° C. for one half hour. The fine glassy material produced in this manner had a bulk density of 50.3 lbs./cu. ft. This material was then wet milled to produce a conventional casting slip in which the average particle size was on the order of 8 to 10 microns. This casting slip was suitable for conventional slip casting of crucibles and similar articles.

EXAMPLE 2

Twelve hundred grams of predampened MS-7 fumed silica were placed in a high shear mixer and water added to provide sixteen hundred sixty grams of water. The mixer was operated at 3800 rpm for 8 minutes to provide a moist granulated silica as in Example 1. After drying overnight at 140° C. this material had a bulk density of 18 lbs/cu. ft. and a seive analysis as follows:

| Mesh Size | Wt. % |
|---|---|
| +10 | — |
| −10 +100 | 27.5 |
| −100 +200 | 12.1 |
| −200 +325 | 4.7 |
| −325 | 55.7 |

The material was then calcined by heating at 1350° C. for one half hour. The calcined material had a bulk density of 57.5 lbs./cu. ft.

EXAMPLE 3

Fumed silica-water mixtures were produced as in Examples 1 and 2 in varying proportions. One series of mixtures was processed in a high shear mixer operated at 1800 rpm, while a second series was processed in the same mixer, but at 3800 rpm. In each case, the mixer was operated for a fixed time, or until a change in energy consumption indicated liquefying of the mix. The solids content (solids) of each mix, the mixer speed (in rpms), and the time in minutes required for liquefaction, are set forth in the following table:

TABLE

| Solids (%) | Mixer Speed (rpms) | Time (minutes) |
| --- | --- | --- |
| 36 | 1800 | 2 |
| 38 | 1800 | 7 |
| 42 | 1800 | >15 |
| 45 | 1800 | >10 |
| 60 | 1800 | >10 |
| 38 | 3800 | 1 |
| 42 | 3800 | 4 |
| 45 | 3800 | 9 |
| 50 | 3800 | >20 |
| 60 | 3800 | >10 |

Several mixes corresponding to those identified above were prepared and mixed for varying times with the mixed material being dried and the bulk density measured on the dried material. These data, recorded below, indicate the effect of mixing time, mixing speed, and solids content on ultimate bulk density.

| Solids (%) | Speed (rpms) | Time (min) | Density (lbs./cu. ft.) |
| --- | --- | --- | --- |
| 36 | 1800 | 1½ | 17.4 |
| 38 | 1800 | 1½ | 14.3 |
| 38 | 1800 | 3 | 16.1 |
| 38 | 1800 | 5 | 18.6 |
| 42 | 1800 | 5 | 10.0 |
| 42 | 1800 | 10 | 10.5 |
| 42 | 1800 | 15 | 10.9 |
| 45 | 1800 | 1½ | 8.7 |
| 45 | 1800 | 10 | 8.7 |
| 60 | 1800 | 1½ | 5.8 |
| 42 | 3800 | 3 | 15.9 |
| 45 | 3800 | 1½ | 8.1 |
| 45 | 3800 | 5 | 11.7 |
| 45 | 3800 | 8 | 18.0 |
| 50 | 3800 | 1½ | 6.5 |
| 50 | 3800 | 5 | 8.5 |
| 50 | 3800 | 20 | 9.5 |
| 60 | 3800 | 10 | 5.2 |

I claim:

1. A method for densifying a fumed metal oxide of Groups III and IV prepared by either a vapor phase oxidation or a combustion process which comprises:
    (a) mechanically mixing said fumed metal oxide with a polar liquid in a high shear mixer, said fumed metal oxide being present in an amount to yield a total solids content in the mixture of between about 35-50% with the said polar liquid being the remainder, and said mixing being carried out at a mixer speed and for a time sufficient to form a granulated material mixture, being insufficient to form a liquid suspension or gel; and then
    (b) drying said granulated material mixture to obtain dried material, said dried material substantially all passing through a 10 mesh screen.

2. A method according to claim 1 wherein the fumed metal oxide is silica.

3. A method according to claim 1 wherein the liquid is water.

4. A method according to claim 1 wherein the total solids content is in the range of 38% to 45%.

5. A method according to claim 1 wherein the granulated oxide is calcined at a temperature in the range of 1150°-1500° C. and then wet milled to form a casting slip.

6. A method according to claim 1 wherein said mixer speed is at least about 1800 rpm.

* * * * *

UNITED STATES PATENT AND TRADEMARK OFFICE
CERTIFICATE OF CORRECTION

PATENT NO. : 4,126,422
DATED : November 21, 1978
INVENTOR(S) : Lewis H. Brandes

It is certified that error appears in the above-identified patent and that said Letters Patent are hereby corrected as shown below:

Column 1, line 21, "2,823,882," should be -- 2,823,982, --.

Signed and Sealed this

Seventeenth Day of July 1979

[SEAL]

Attest:

LUTRELLE F. PARKER

Attesting Officer     Acting Commissioner of Patents and Trademarks